3,098,835
NEW THERMOSETTING COMPOSITIONS OF ACRYLIC POLYESTER AND AMINE-ALDEHYDE RESINS
Norman G. Gaylord, New Providence, N.J., assignor to Interchemical Corporation, New York, N.Y., a corporation of Ohio
No Drawing. Filed Mar. 23, 1960, Ser. No. 16,956
22 Claims. (Cl. 260—33.6)

This invention relates to new thermosetting coating compositions. More particularly, it relates to coating compositions comprising blends of low molecular weight organic solvent soluble acrylic copolymers, polyester resins and amine-aldehyde resins.

For a number of years it has been known that extremely hard thermosetting resins that are stain and scratch resistant can be made by reaction of an aldehyde (preferably formaldehyde) with a polyfunctional amide, such as urea, biuret, dicyandiamide, and (especially) triazines such as ammeline, melamine, substituted melamines, benzoguanamine etc. The resulting resins may be prepared in aqueous solutions or in lower alcohols, in which case they are hydrophilic, or they may be produced in the presence of higher alcohols, such as butyl, in which case they are hydrophobic and may be used as a solution in a mixture of higher alcohol (e.g., butyl or higher) and aromatic hydrocarbon (e.g., xylene or toluene). These resins are available commercially under trade-names such as Uformite, Resimene, Aerotex, Melmac, etc.

These "amine-aldehyde" resins have proven very valuable in a number of applications. Used by themselves they are excellent for certain molding uses, but without extensive modification they are unsatisfactory for most surface coating applications due to their poor adhesion to many metal surfaces and to their very slight flexibility. This is unfortunate because their extraordinary hardness and good alkali and detergent resistance all represent properties much sought after for many surface coating applications.

Copending application, Serial Number 768,839, now U.S. Patent No. 2,985,611, filed October 22, 1958, discloses a low molecular weight, organic solvent soluble, norbornene nucleus containing acrylic copolymer as well as blends of said copolymer with amine-aldehyde resins. These blends provide coating compositions which upon heat curing yield very durable surface coatings for metal surfaces.

It has now been discovered that the above described acrylic copolymers may be blended with polyester resins and amine-aldehydes to provide compositions which adhere well to metal surfaces, are tough and homogeneous, are hard and scratch resistant, exhibit excellent resistance to the attack of alkalies, soaps, and detergents, are flexible, have excellent gloss and are remarkably stable to discoloration, even when subjected to heating at considerably higher temperatures or for longer periods than is needed for full cure and in addition may be prepared at lower cost than the acrylic copolymer-amine-aldehyde blends of the above described copending application.

The new composition of this invention comprises essentially a blend of three major components.

(A) An acrylic copolymer made by the addition polymerization of a mixture of monomers comprising from 5% to 30% by weight of an non-allylic alcohol containing the norbornene nucleus and an ethylenically unsaturated ester material having the formula

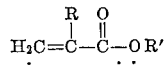

(B) A polyester resin comprising the reaction product of (1) an aromatic dicarboxylic acid such as isophthalic acid and phthalic anhydride, (2) alpha-beta ethylenic dicarboxylic acids such as maleic anhydride and fumaric acid or aliphatic dicarboxylic acids having a chain length of 6–10 carbons, (3) an aliphatic mono-carboxylic acid having a chain length of 8 to 12 carbon atoms or benzoic acid, (4) a dihydric alcohol and (5) a polyhydric alcohol having at least 3 hydroxyl groups.

(C) The reaction product of a polyfunctional amide and an aldehyde.

The norbornene nucleus containing acrylic copolymers are defined in copending application Serial No. 768,839, filed October 22, 1958 (U.S. Pat. No. 2,985,611), as a low molecular weight organic solvent soluble acrylic copolymer produced by the addition polymerization of a mixture of monomers comprising (1) a minor portion of a non-allylic alcohol containing the norbornene nucleus, (2) a major proportion of an ester or a mixture of esters selected from the group consisting of the alkyl esters of acrylic and methacrylic acid in which the alkyl groups contain from one to eight carbon atoms. The non-allylic alcohol containing the norbornene nucleus will ordinarily constitute about 5–30% of the copolymerization mixture, and the $C_1$–$C_8$ alkyl esters of acrylic and/or methacrylic acids will usually constitute from about 50% to about 95% of the copolymerization mixture. Preferably, there will also be present in the copolymerization mixture certain modifiers in amount about 2–35%. These modifiers include acids such as acrylic and methacrylic; nitriles, such as acrylonitrile and methacrylonitrile; vinyl esters, such as vinyl acetate, vinyl propionate and vinyl stearate; esters of unsaturated dibasic acids such as dimethyl maleate and dibutyl fumarate; styrene, alpha-methyl styrene, and the various vinyl toluenes; amides, such as acrylamide, methacrylamide, methylolacrylamide, and methylol-methacrylamide, hydroxyl compounds such as ethylene glycol monoacrylate or monomethacrylate, glycerol monoacrylate or monomethacrylate or monomethacrylate or glycerol allyl ether and vinyl alkyl ethers such as vinyl butyl ether, vinyl ethyl ether, vinyl hexyl ether, etc.

With respect to the non-allylic alcohols containing the norbornene nucleus it should be noted that norbornene has the formula:

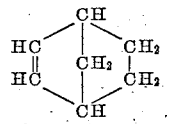

While for the purpose of describing the present invention, reference will be made mostly to copolymers of 2-hydroxymethyl-5-norbornene which has the following structure:

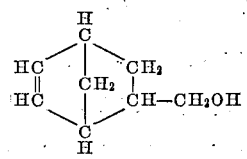

it will be understood that related homologs can readily be used and it is intended that the appended claims will cover the use of such compounds.

2-hydroxymethyl-5-norbornene is readily prepared by reacting allyl alcohol with cyclopentadiene (U.S. Patents No. 2,596,279 and No. 2,352,606). Alkyl substituted cyclopentadienes behave similarly to yield corresponding substituted derivatives. Likewise, compounds containing two alcoholic hydroxyl groups can be obtained by condensing an unsaturated diol, such as butenediol with cyclopentadienes.

These acrylic copolymers are prepared in solution by addition polymerization initiated by conventional free radical type initiators which have been described fully hereinabove. Benzoyl peroxide is preferably used as an initiator in the polymerization. Xylene is preferably used as the solvent although other conventional solvents such as benzene, ethyl benzene or toluene may be used.

In a further embodiment of this invention epoxy resin acrylic graft copolymers which are more fully described in copending application Serial No. 808,887, April 24, 1959, now U.S. Patent 3,028,359, may be used in place of the acrylic copolymers. These graft copolymers are prepared by the above described method for preparing the norbornene nucleus containing acrylic copolymers and using the same ingredients except said monomers are polymerized by addition polymerization in the presence of epoxy resins.

The epoxy resins used in this invention are conventionally prepared by reacting a polyhydric phenol, particularly Bisphenol A with epichlorohydrin. By regularizing the proportions of these two reactants, the molecular size and the molecular structure of the ethoxyline resins produced may be controlled. By using an excess of epichlorohydrin, a low molecular weight ethoxyline resin is produced. By increasing the amount of Bisphenol A used, higher molecular weight epoxy resins are produced. In the preparation of these graft copolymers, it is preferable to use epoxy resins having molecular weights of 350 to 875, epoxide equivalent weights of 175 to 525 and an average of 1.7 to 1.9 epoxides per molecule. We have found best results are secured when epoxy resins having a molecular weight of 875, an epoxide equivalent weight of 485 and an average of 1.7 to 1.9 epoxide groups per molecule are used. One available commercial resin having these properties is "Epon 1001." While it is not critical, it is preferred to have the epoxy resin constitute 9 to 37% parts by weight of the total starting reactants in the preparation of the graft copolymer.

The polyester resins blended with the above described ingredients to provide the coating composition of this invention comprise the esterification product of the following components. It should be noted that the proportions are not considered to be critical. The ranges given are those which yield the most desirable results.

(1) Aromatic dicarboxylic acid, 26 to 32% by weight includes isophthalic acid and phthalic anhydrides which includes 3 - isopropyl-6-methyl-3,6-endoethylene-$\Delta^4$-tetrahydrophthalic anhydride.

(2) 7–10% by weight of an alpha-beta ethylenic dicarboxylic acid such as maleic anhydride and fumaric acid or 7–10% by weight of aliphatic dicarboxylic acids having a chain length of 6–10 carbons such as adipic, azelaic and sebacic acids.

(3) 23–32% by weight of an aliphatic monocarboxylic acid having a chain length of 8–12. These include caprylic, pelargonic, capric and lauric acids or 23–32% by weight of either benzoic or para-tertiary butyl benzoic acids.

(4) 13–29% by weight of a dihydric alcohol such as 1,3 butylene glycerol, neopentylglycol and 1,4-butandiol.

(5) 9–22% by weight of a polyhydric alcohol having at least 3 hydroxyl groups. These include trimethylol ethane, trimethylol propane, 1,2,6 hexane triol and pentaerythritol.

With respect to the amine-aldehyde resins used in the compositions of this invention, it should be noted that while Uformite MX61, a butylated benzoguanamine-formaldehyde resin has been primarily used in the illustrative example, there is no intent to limit the practice of this invention to the use of said resins. The resin was merely selected as a commercially convenient form. Other commercially available amine-aldehyde resins such as those marketed under the trade-names Resimene, Aerotex and Cymel may be readily used. In fact, Resimene 875 a butylated melamine-formaldehyde resin has been used and found to be a very satisfactory substitute for the Uformite MX61. The amine-aldehyde resins can be made by the reaction of an aldehyde (preferably formaldehyde) with a polyfunctional amide, such as urea, biuret, dicyandiamide and triazines such as ammeline, melamine, substituted melamines and benzoguanamine.

In preparing the novel blends of this invention, solutions of the amine-aldehyde resins are blended with solutions of the acrylic copolymers and solutions of the polyester resins. As solvents for these components, xylene is preferred but other organic solvents such as toluene, benzene, aromatic petroleum naphthas and ketones may be readily used. While not critical it is preferable to blend the three components in the following ratios which are given by weight on a solids basis.

| | Parts by weight |
|---|---|
| Amine-aldehyde resin | 4 to 5 |
| Polyester resin | 1 to 4 |
| Acrylic copolymer or acrylic epoxy resin graft copolymer | 4 to 5 |

It should also be noted that the novel compositions of this invention have excellent pigment dispersing properties and that these may be readily pigmented with any of the standard enamel varnish pigments to yield pigmented coatings upon curing.

The following examples will illustrate the practice of this invention.

EXAMPLE 1

A solution of 220 g. of butyl acrylate, 13 g. of methyl methacrylate and 13 g. of methacrylic acid and 6 g. of benzoyl peroxide in 150 g. of xylene is added dropwise over a period of 2½ hours to 54 g. of 2-hydroxymethyl-5-norbornene and 150 g. of xylene maintained at 90° C. The mixture is maintained at 90° C. for another ½ hour, at which time, 1.5 g. of benzoyl peroxide are added and the mixture is continued at 90° C. for 1½ more hours. The mixture is then heated to 125° C. and held at that temperature for 1 hour. The solids content of the product is 44.2% indicating a 88% conversion of monomers to copolymer. The viscosity (Gardner-Holdt at 25° C.) is F.

EXAMPLE 2

A solution of 1320 g. of butyl acrylate, 78 g. of methyl methacrylate, 13 g. of methacrylic acid and 36 g. of benzoyl peroxide in 900 g. of xylene is added dropwise over a period of 2½ hours to 324 g. of 2-hydroxymethyl-5-norbornene and 900 g. of xylene maintained at 90° C. The mixture is maintained at 90° C. for another ½ hour, at which time, 1.5 g. of benzoyl peroxide are added and the mixture is continued at 90° C. for 1½ more hours. The mixture is then heated to 125° C. and held at that temperature for 1 hour. The solid content of the product is 44.7% by weight indicating a 89.4% conversion of monomers to copolymer. The viscosity (Gardner-Holdt at 25° C.) is F.

EXAMPLE 3

| | G. |
|---|---|
| Group A: | |
| 2-hydroxymethyl-5-norbornene | 135.0 |
| Xylene | 450.0 |
| Group B: | |
| Ethyl acrylate | 675.0 |
| Methacrylic acid | 90.0 |
| Xylene | 450.0 |
| Benzoyl peroxide | 18.0 |
| Group C: | |
| Benzoyl peroxide | 4.5 |
| Group D: | |
| Benzoyl peroxide | 4.5 |
| Group E: | |
| Benzoyl peroxide | 4.5 |

Group A is charged into the reaction vessel and heated with stirring under nitrogen to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for 3 more hours when D is added. The temperature is maintained at 90° C. for 3 hours and E is added. The temperature is maintained at 90° C. for 3 hours. The temperature is then raised to 125° C. for one hour to destroy residual catalyst. The final copolymer solution has a 46.4% non-volatile content indicating a 92.8% conversion of monomers to copolymer.

EXAMPLE 4

Group A:                                                          G.
   2-hydroxymethyl-5-norbornene _____ 135.0
   Xylene _____ 450.0
Group B:
   Methyl methacrylate_____ 720.0
   Methacrylic acid_____ 45.0
   Xylene _____ 450.0
   Benzoyl peroxide_____ 18.0
Group C:
   Benzoyl peroxide_____ 4.5
Group D:
   Benzoyl peroxide_____ 4.5

Group A is charged into the reaction vessel and heated with stirring under nitrogen to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for 3 more hours when D is added. The temperature is maintained at 90° C. for an additional 3 hours when temperature is raised to 125° C. for 1 hour to destroy residual catalyst. The final copolymer solution has a 45.5% non-volatile content indicating a 91% conversion of monomers to polymers.

EXAMPLE 5

Group A:                                                          G.
   2-hydroxymethyl-5-norbornene _____ 135.0
   Xylene _____ 450.0
Group B:
   Methyl methacrylate_____ 180.0
   Butyl acrylate_____ 495.0
   Styrene _____ 45.0
   Methacrylic acid_____ 45.0
   Xylene _____ 450.0
   Benzoyl peroxide_____ 18.0
Group C:
   Benzoyl peroxide_____ 4.5
Group D:
   Benzoyl peroxide_____ 4.5

A is charged into the reaction vessel and heated under nitrogen to 90° C. Group B is added dropwise over a period of 1.5 hours, maintaining the temperature at 90° C., with intermittent cooling, if necessary. The temperature is maintained at 90° C. for 1.5 hours when C is added. The temperature is maintained at 90° C. for 3 hours when D is added. The temperature is maintained at 90° C. for 3 more hours when the temperature is raised to 125° C. for 1 hour to destroy residual catalyst. The final copolymer solution has a 44.9% non-volatile content indicating a 89.9% conversion of monomers to polymer.

EXAMPLE 6.—ACRYLIC COPOLYMER G

Group A:                                                          G.
   2-hydroxymethyl-5-norbornene _____ 135.0
   Xylene _____ 450.0
Group B:
   Butyl acrylate_____ 720.0
   Methacrylic acid_____ 45.0
   Xylene _____ 450.0
   Benzoyl peroxide_____ 18.0
Group C:
   Benzoyl peroxide_____ 4.5
Group D:
   Benzoyl peroxide_____ 4.5
Group E:
   Benzoyl peroxide_____ 4.5

A is charged into the reaction vessel and heated with stirring to 90° C. Group B is added dropwise over a period of 1.5 hours while the temperature is maintained at 90° C. with intermittent cooling, if necessary. C is added 1.5 hours after the completion of the dropwise addition of B. The temperature is maintained at 90° C. for an additional 3 hours when E is added. The temperature is maintained at 90° C. for 3 more hours when the temperature is raised to 125° C. for 1 hour to destroy residual catalyst. The final copolymer has a 46.6% non-volatile content indicating a 93.2% conversion of monomers to polymer.

EXAMPLE 7

G.
A. Isophthalic acid_____ 100
B. Maleic anhydride_____ 29.5
C. Pelargonic acid_____ 96
D. Neopentyl glycol_____ 103
E. Trimethylol ethane_____ 36
F. Xylol _____ 36

A mixture of ingredients A, B, C, D, and E is heated under a $CO_2$ atmosphere and air cooled reflux to 185° C.–190° C. Then the temperature is slowly raised to 220° C. over a period of 4 hours. The mixture is allowed to cool to room temperature and F is added. Water formed during the reaction is then removed by azeotropic distillation of the mixture between 225° C. and 260° C. The azeotropic distillation is continued until the solids contained in the mixture have an acid value below 10. Additional xylol is added to adjust the solids content of the product to 60% solids by weight.

EXAMPLE 8

G.
A. Isopropyl-6-methyl-3,6-endo ethylene - $\Delta^4$ - tetrahydro phthalic anhydride_____ 774
B. Maleic anhydride_____ 177
C. Pelargonic acid_____ 570
D. Neopentyl glycol_____ 699
E. Trimethylol ethane_____ 240
F. Xylol _____ 246

Mix items A through F and heat the mixture to 165° C. Commencing at 165° C. azeotropically distill water. Continue the distillation until the mixture has an acid number of 11. This will require 11 hours during which time the temperature of the mixture rises to 240° C. Additional xylol is added to adjust the solids content of the product to 60% solids by weight.

EXAMPLE 9

G.
A. Isophthalic acid_____ 100
B. Maleic anhydride_____ 29.5
C. Neopentyl glycol_____ 93.5
D. Pelargonic acid_____ 67
E. A mixture of 88 parts by weight of pentaerythritol and 12 parts by weight of dipentaerythritol__ 166
F. Xylol _____ 45
G. Pelargonic acid_____ 29

Ingredients A, B and C are heated to and maintained at 190° C. under air cooled reflux for 3 hours during which time, the temperature rises to 220° C. The mixture is allowed to cool to room temperature and D, E and F are added. The mixture is azeotropically distilled to remove water formed during the reaction at 165° C. The distillation is continued until the acid number of the mixture drops below 10. This requires 5 hours during which time, the temperature rises to 235° C. The mixture is cooled to room temperature and G is added. The mixture is again azeotropically distilled at temperatures between 170° C. and 235° C. for 2 hours until the acid number falls below 10. Additional xylol is added to adjust the solids content of the product to 60% solids by weight.

EXAMPLE 10

| | G. |
|---|---|
| A. 3-isopropyl-6-methyl-3,6-endo ethylene-Δ⁴-tetrahydrophthalic anhydride | 129 |
| B. Maleic anhydride | 29.5 |
| C. Pelargonic acid | 95 |
| D. Neopentyl glycol | 93.5 |
| E. Pentek [1] | 166 |
| F. Xylol | 51 |

[1] A product comprising a mixture of 88 parts by weight of pentaerythritol and 12 parts by weight of dipentaerythritol.

Ingredients A through F are mixed and heated to 180° C. to azeotropically distill water formed during the reaction. The distillation is continued until the acid number of the mixture falls below 10. Sufficient xylol is then added to adjust the solids content of the product to 60% solids by weight.

EXAMPLE 11

| | G. |
|---|---|
| A. 3-isopropyl-6-methyl-3,6-endo ethylene-Δ⁴ - tetrahydrophthalic anhydride | 129 |
| B. Maleic anhydride | 29.5 |
| C. Pelargonic acid | 95 |
| D. Neopentyl glycol | 116.5 |
| E. Trimethylol ethane | 166 |
| F. Xylol | 41 |

Example 10 is repeated, using the above ingredients.

EXAMPLE 12

| | G. |
|---|---|
| A. Isopthalic acid | 99 |
| B. Fumaric acid | 96 |
| C. Pelargonic acid | 120 |
| D. Neopentyl glycol | 156 |
| E. Trimethylol ethane | 40 |
| F. Xylol | 41 |

Ingredients A through E are mixed and heated to 180° C. under air cooled reflux. Heating is continued for 3 hours during which time, the temperature is slowly raised to 240° C. The mixture is then allowed to cool to 145° C. and 41 g. xylol are added. The mixture is then azeotropically distilled for 3 hours to remove water formed, during which time, the temperature of the mixture rises to 242° C. When the acid number of the mixture drops below 10, the distillation is discontinued. Xylol is added to adjust the solid content of the product to 70% solids by weight.

EXAMPLE 13

| | G. |
|---|---|
| Group A: | |
| Isophthalic acid | 299 |
| Furamic acid | 104 |
| Lauric acid | 360 |
| Neopentyl glycol | 168 |
| Trimethylol ethane | 216 |
| Group B: | |
| Xylene | 57 |

Charge group A into a flask and heat under air cooled condenser and $CO_2$ atmosphere to 165–170° C. Raise temperature to 235–240° C. over 3 hours and hold until clear. Cool to 170° C., charge B and azeotropically distill to an acid value of 9–11. Cool. Cut batch to 60% total non-volatiles in xylene. The solution has a Gardner-Holdt viscosity of G–H.

EXAMPLE 14

| | G. |
|---|---|
| Group A: | |
| Isophthalic acid | 299 |
| Adipic acid | 131 |
| Pelargonic acid | 288 |
| Neopentyl glycol | 168.5 |
| Trimethylol ethane | 216 |
| Group B: | |
| Xylene | 55 |

Charge group A into a flask and heat under $CO_2$ atmosphere with air cooled condenser to 165–170° C. Raise temperature to 235–240° C. in 3 hours and hold until clear. Cool to 170° C., charge B and azeotrope to an acid value of 9. Cool. Cut to 60% by weight of total non-volatiles in xylene. The solution has a Gardner-Holdt viscosity of E–F.

EXAMPLE 15

| | G. |
|---|---|
| Group A: | |
| Isophthalic acid | 299 |
| Fumaric acid | 104 |
| Pelargonic acid | 388 |
| Neopentyl glycol | 168.5 |
| 1,2,6-hexane triol | 241 |
| Group B: | |
| Xylene | 55 |

Charge group A into a flask and heat under $CO_2$ and air-cooled condenser to 165–170° C. Raise temperature to 235–240° C. over 3 hours and hold until clear. Cool to 170° C., charge B and azeotrope to an acid value of 9. Cool. Cut batch to 60% by weight of total non-volatiles in xylene. The solution has a Gardner-Holdt viscosity of M–N.

EXAMPLE 16

| | G. |
|---|---|
| Group A: | |
| Isophthalic acid | 299 |
| Fumaric acid | 104 |
| Pelargonic acid | 288 |
| Neopentyl glycol | 192 |
| Trimethylol propane | 220 |
| Group B: | |
| Xylene | 55 |

Charge group A into a flask and heat under $CO_2$ and air-cooled reflux to 165–170° C. Raise temperature to 235–240° C. in 3 hours and hold until clear. Cool to 170° C., and add B and azeotrope to an acid value of 9. Cool. Cut batch to 60% by weight of total non-volatiles with xylene. Solution viscosity is E–F on Gardner-Holdt scale.

EXAMPLE 17

| | G. |
|---|---|
| Group A: | |
| Isophthalic acid | 299 |
| Fumaric acid | 104 |
| Benzoic acid | 220 |
| Neopentyl glycol | 168.5 |
| Trimethylol ethane | 216 |
| Group B: | |
| Xylene | 50 |

Charge group A into a flask and heat under air cooled condenser and $CO_2$ atmosphere to 165–170° C. Raise temperature to 235–240° C. in 3 hours and hold until clear. Cool to 170° C., charge B and azeotrope to an acid value of 9–11. Cool. Cut batch to 60% by weight of total non-volatiles in xylene. The solution has a Gardner-Holdt viscosity of W–X.

EXAMPLE 18

| | G. |
|---|---|
| Group A: | |
| Isophthalic acid | 299 |
| Fumaric acid | 104 |
| Pelargonic acid | 288 |
| Neopentyl glycol | 192 |
| Pentek | 178 |
| Group B: | |
| Xylene | 53 |

Charge group A into a flask and heat under air cooled condenser and $CO_2$ atmosphere to 165–170° C. Raise temperature to 235–240° C. in 3 hours and hold until clear. Cool to 170° C., charge B and azeotrope to an acid value of 27–29. Cool. Cut batch to 60% by weight of total volatiles in 6/4 weight ratio of xylene/n-butanol. The solution has a Gardner-Holdt viscosity of U–V.

EXAMPLE 19

Group A: | G.
---|---
Isophthalic acid | 299
Fumaric acid | 104
Para-tertiary butyl benzoic acid | 320
Neopentyl glycol | 192
Trimethylol ethane | 198
Group B: |
Xylene | 56

Charge group A into a flask and heat under air cooled condenser and $CO_2$ atmosphere to 165–170° C. Raise temperature to 235–240° C. in 3 hours and hold until clear. Cool to 170° C., charge B and azeotrope to an acid value of 9–11. Cool. Cut batch to 60% by weight of total non-volatiles in xylene. The solution has a Gardner-Holdt viscosity of T–U.

EXAMPLE 20

The following blend is prepared:

| | Parts by weight |
|---|---|
| Copolymer of Example 1 | 2 |
| Polyester resin of Example 12 | 4 |
| Uformite MX61 (a butylated benzoguanamine-formaldehyde resin) | 4 |

The blend is drawn down on a steel panel and baked at 177° C. for 30 minutes. The resulting film shows a good cure, high gloss, good color, is hard and exhibits an excellent resistance to soaps, solvents and detergents.

EXAMPLE 21

The following blend is prepared:

| | Parts by weight |
|---|---|
| Copolymer of Example 2 | 3 |
| Polyester resin of Example 9 | 3 |
| Uformite MX61 | 4 |

The blend is drawn down on a steel panel and baked at 177° C. for 30 minutes. The resulting film is well cured, tough, flexible, has a high gloss and good color and retains such gloss and color when baked for a second time at 204° C. for 1 hour. The film displays a good resistance to soaps, solvents and detergents.

The above procedure is repeated with the proportions by weight of the copolymer:polyester resin:Uformite MX61 in the ratios of 2:4:4 and 4:2:4. The baked films formed have properties equivalent to those of the films described above.

EXAMPLE 22

The following blend is prepared:

| | Parts by weight |
|---|---|
| Copolymer of Example 2 | 3 |
| Polyester resin of Example 8 | 3 |
| Uformite MX61 | 4 |

Two other blends of the above ingredients are prepared wherein the proportions are varied as follows:

| | (a) | (b) |
|---|---|---|
| Copolymer of Example 2 | 4 parts | 2 parts |
| Polyester resin of Example 8 | 2 parts | 4 parts |
| Uformite MX61 | 4 parts | 4 parts |

All three blends are drawn down on respective steel panels and baked at 177° C. for 30 minutes. The resulting films have properties which are equivalent to those of Example 21.

EXAMPLE 23

The procedure of Example 21 is repeated with the following 3 blends:

| | (1) Parts | (2) Parts | (3) Parts |
|---|---|---|---|
| Copolymer of Example 2 | 3 | 2 | 4 |
| Polyester Resin of Example 7 | 3 | 4 | 2 |
| Uformite MX61 | 4 | 4 | 4 |

All three blends are drawn down on respective steel panels and baked at 177° C. for 30 minutes. The resulting films have properties which are equivalent to those of Examples 21 and 22.

EXAMPLE 24

The following blend is prepared:

| | Parts by weight |
|---|---|
| Copolymer of Example 2 | 3 |
| Polyester resin of Example 10 | 3 |
| Uformite MX61 | 4 |

The blend is drawn down on a steel panel and baked at 177° C. for 30 minutes. The resulting film has properties equivalent to those of Example 21 except that initial color is not as good nor is the color retention on second bake as good.

EXAMPLE 25

The following blend is prepared:

| | Parts by weight |
|---|---|
| Copolymer of Example 2 | 3 |
| Polyester resin of Example 12 | 3 |
| Uformite MX61 | 4 |

The blend is drawn down on a steel panel and baked at 177° C. for 30 minutes. The resulting film shows good gloss and color but is soft, brittle and does not display a detergent resistance equivalent to that of the film in Example 11.

The following blends in Table I are prepared: Films of these blends are sprayed on steel panels and baked at 177° C. for 30 minutes. In each of the cases, the cured film is hard, flexible, well cured, resistant to soaps, solvent and detergents as well as having good initial color and gloss and good color and gloss retention on being rebaked.

*Table I*

| Example | Acrylic Copolymer Prepared in Ex.— | Parts by Weight | Polyester Resin Prepared in Ex.— | Parts by Weight | Parts by weight of Butylated Benzoguanamine Formaldehyde Resin |
|---|---|---|---|---|---|
| 26 | 1 | 4 | 13 | 2 | 4 |
| 27 | 1 | 5 | 13 | 1 | 4 |
| 28 | 2 | 4 | 13 | 2 | 4 |
| 29 | 1 | 5 | 17 | 1 | 4 |
| 30 | 1 | 5 | 14 | 1 | 4 |
| 31 | 1 | 4 | 44 | 2 | 4 |
| 32 | 2 | 5 | 14 | 1 | 4 |
| 33 | 1 | 4 | 16 | 2 | 4 |
| 34 | 2 | 4 | 16 | 2 | 4 |
| 35 | 2 | 4 | 18 | 2 | 4 |
| 36 | 1 | 5 | 15 | 1 | 4 |
| 37 | 2 | 5 | 15 | 1 | 4 |
| 38 | 1 | 4 | 19 | 2 | 4 |
| 39 | 2 | 4 | 19 | 2 | 4 |
| 40 | 3 | 4 | 13 | 1 | 5 |
| 41 | 5 | 5 | 16 | 1 | 4 |
| 42 | 4 | 4 | 14 | 1 | 5 |
| 43 | 3 | 5 | 16 | 1 | 4 |
| 44 | 5 | 5 | 13 | 1 | 4 |
| 45 | 6 | 5 | 14 | 1 | 4 |

EXAMPLE 46

| | G. |
|---|---|
| A. Epon 1001 | 450 |
| B. 2-hydroxymethyl-5-norbornene | 270 |
| C. Xylene | 750 |
| D. Butyl acrylate | 1100 |
| E. Methyl methacrylate | 65 |
| F. Methacrylic acid | 65 |
| G. Xylene | 750 |
| H. Benzoyl peroxide | 30 |
| I. Benzoyl peroxide | 7.5 |

A, B, and C are heated to 90° C. while continually stirring under a nitrogen atmosphere. D, E, F, G, and H are mixed and the mixture is added dropwise to the A, B, and C mixture over a period of 2½ hours while the temperature is maintained at 90° C. The mixture is maintained at 90° C. for ½ hour and I is added. The mixture is maintained at 90° C. for 1½ hours after which the mixture is raised to 125° C. and maintained at that temperature for 1 hour. The solids content of the product is 54.4% by weight.

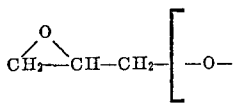

The following blends listed in Table II comprising epoxy resin containing acrylic graft copolymers are made and cured films thereof are prepared in accordance with the procedure set forth with respect to Examples 26–45 in Table I. The resulting cured films have properties equivalent to the properties of the films of Examples 26–45.

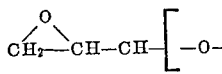

Table II

| Example No. | Acrylic Epoxy Resin Graft Copolymer Prepared | Parts by Weight | Polyester Prepared in Example— | Parts by Weight | Butylated Benzoguanamine formaldehyde, parts by Weight |
|---|---|---|---|---|---|
| 47 | Ex. 1 | 4 | 13 | 2 | 4 |
| 48 | Ex. 1 | 5 | 17 | 1 | 4 |
| 49 | Ex. 1 | 4 | 17 | 2 | 4 |
| 50 | Ex. 1 | 4 | 19 | 2 | 4 |
| 51 | Ex. 1 | 5 | 19 | 1 | 4 |
| 52 | Ex. 1 | 5 | 14 | 1 | 4 |
| 53 | Ex. 1 | 4 | 18 | 2 | 4 |
| 54 | Ex. 1 | 5 | 15 | 1 | 4 |
| 55 | Ex. 1 | 4 | 15 | 2 | 4 |
| 56 | Ex. 1 | 4 | 16 | 2 | 4 |

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of this invention.

What is claimed is:
1. A thermosetting composition comprising
   (a) An organic solvent soluble acrylic copolymer made by free-radical initiated copolymerization of a mixture of monomers comprising (1) from about 5% to about 30% by weight of a non-allylic alcohol containing the norbornene nucleus, and (2) from about 60% to about 90% by weight of olefinically unsaturated ester material having the formula:

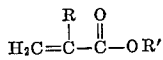

in which R is a member of the group consisting of hydrogen, ethyl and methyl, and R' is an alkyl radical containing from 1 to 8 carbon atoms,
   (b) A polyester resin comprising the reaction product of (1) an aromatic dicarboxylic acid selected from the group consisting of isophthalic acid and phthalic anhydride, (2) an acid member selected from the group consisting of maleic anhydride, fumaric acid and adipic acid, (3) a mono-carboxylic acid selected from the group consisting of pelargonic acid, lauric acid and benzoic acid, (4) neopentyl glycol and (5) a polyhydric alcohol having at least 3 hydroxyl groups selected from the group consisting of trimethylol ethane, trimethylol propane, 1,2,5 hexane triol, and pentaerythritol, and (c) an amine-aldehyde resin selected from the group consisting of urea-aldehyde resins and triazine-aldehyde resins.

2. A thermosetting composition according to claim 1, wherein said acrylic copolymer comprises the addition polymerization product of a mixture of monomers which further includes methacrylic acid.

3. A thermosetting composition as defined in claim 1, wherein said acrylic copolymer further includes 9% to 37% by weight of an epoxy resin having the formula

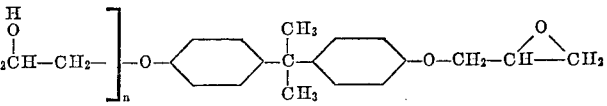

where $n$ is an integer from 0 to 2.

4. A thermosetting composition according to claim 2, wherein said mixture of monomers comprises butyl acrylate, 2-hydroxymethyl-5-norbornene and methacrylic acid.

5. The thermosetting composition defined in claim 4, which further includes 9% to 37% by weight of an epoxy resin having the formula

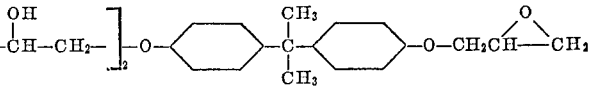

6. A thermosetting composition according to claim 2, wherein said mixture of monomers comprises 2-hydroxymethyl-5-norbornene, ethyl acrylate and methacrylic acid.

7. A thermosetting composition according to claim 2, wherein said mixture of monomers comprises 2-hydroxymethyl-5-norbornene, butyl acrylate, methyl methacrylate, methacrylic acid and further includes styrene.

8. A thermosetting composition according to claim 1, wherein said polyester resin comprises the reaction product of isophthalic acid, maleic anhydride, pelargonic acid, neopentyl glycol and trimethylol ethane.

9. A thermosetting composition according to claim 1, wherein said polyester resin comprises 3-isopropyl-6-methyl-3,6-endoethylene-$\Delta_4$-tetrahydrophthalic anhydride, maleic anhydride, pelargonic acid, neopentyl glycol and pentaerythritol.

10. A thermosetting composition according to claim 1, wherein said polyester resin comprises isophthalic acid, fumaric acid, benzoic acid, neopentyl glycol and trimethylol ethane.

11. A thermosetting composition according to claim 1, wherein said amine-aldehyde resin is a benzoguanamine-formaldehyde resin.

12. A surface coating composition comprising a volatile aromatic hydrocarbon solvent solution of the composition defined in claim 1.

13. A surface coating composition comprising a volatile aromatic hydrocarbon solvent solution of the composition defined in claim 2.

14. A surface coating composition comprising a volatile aromatic hydrocarbon solvent solution of the composition defined in claim 3.

15. A surface coating composition comprising a volatile aromatic hydrocarbon solvent solution of the composition defined in claim 4.

16. A surface coating composition comprising a volatile aromatic hydrocarbon solvent solution of the composition defined in claim 5.

17. A surface coating composition comprising a volatile aromatic hydrocarbon solvent solution of the composition defined in claim 6.

18. A surface coating composition comprising a volatile aromatic hydrocarbon solvent solution of the composition defined in claim 7.

19. A surface coating composition comprising a volatile aromatic hydrocarbon solvent solution of the composition defined in claim 8.

20. A surface coating composition comprising a volatile aromatic hydrocarbon solvent solution of the composition defined in claim 9.

21. A surface coating composition comprising a volatile aromatic hydrocarbon solvent solution of the composition defined in claim 10.

22. A surface coating composition comprising a volatile aromatic hydrocarbon solvent solution of the composition defined in claim 11.

References Cited in the file of this patent

UNITED STATES PATENTS

| | | |
|---|---|---|
| 2,649,423 | Spencer | Aug. 18, 1953 |
| 2,890,185 | Sample et al. | June 9, 1959 |
| 2,895,929 | Yusem | July 21, 1959 |